May 3, 1927.
O. A. HOKANSON
1,627,390
REMOVABLE CARRIAGE FOR TYPEWRITERS
Filed Sept. 12, 1924     6 Sheets-Sheet 1
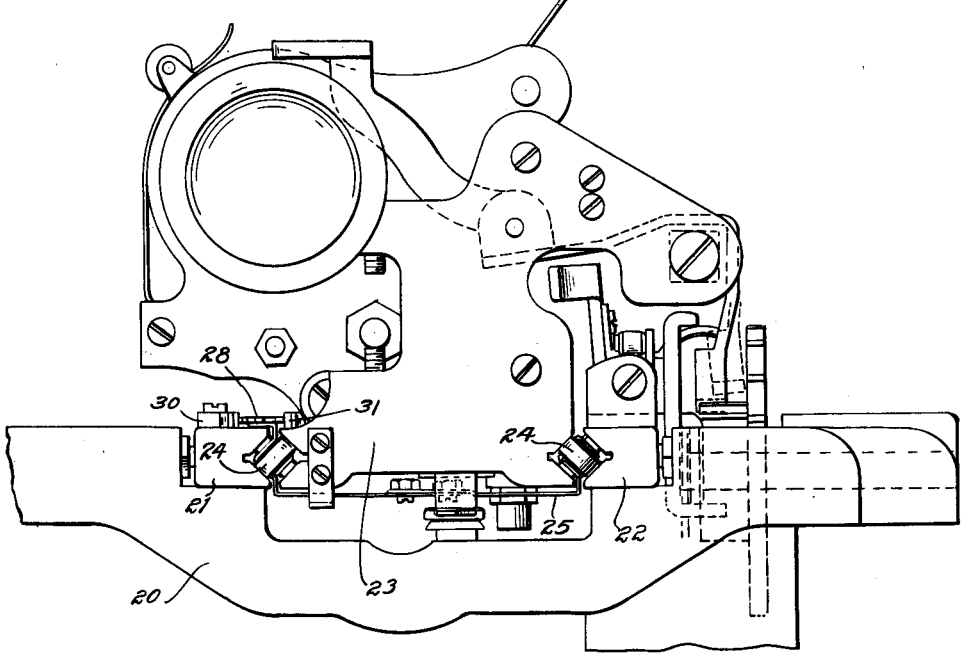
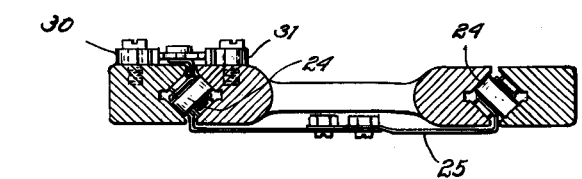
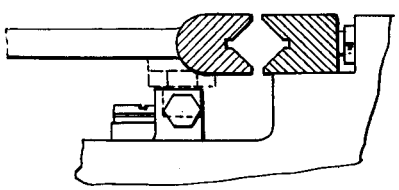
Inventor
Otto A. Hokanson
By Nissen & Crane
Attys May 3, 1927.
O. A. HOKANSON
1,627,390
REMOVABLE CARRIAGE FOR TYPEWRITERS
Filed Sept. 12, 1924   6 Sheets-Sheet 2
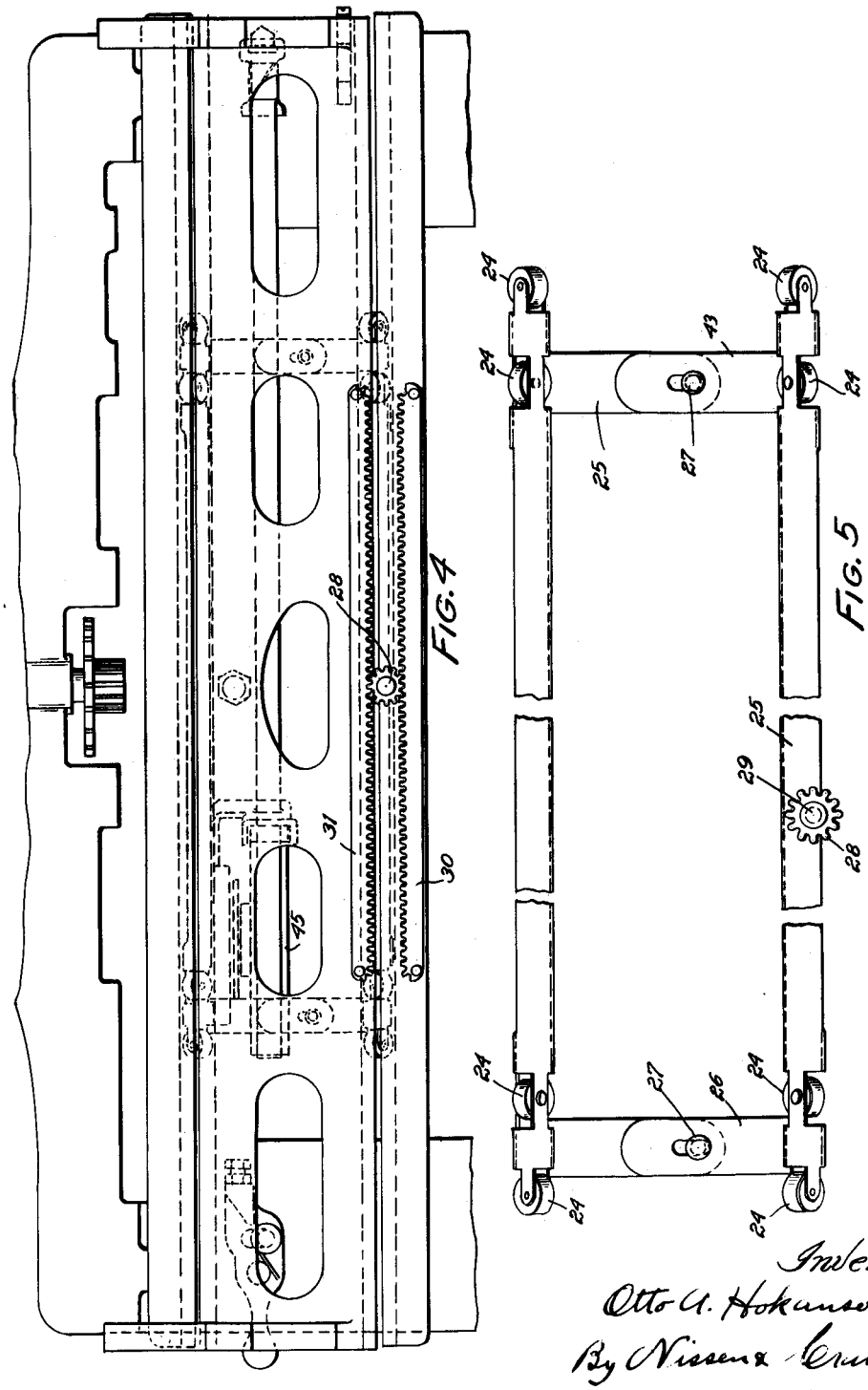

May 3, 1927. 1,627,390
O. A. HOKANSON
REMOVABLE CARRIAGE FOR TYPEWRITERS
Filed Sept. 12, 1924 6 Sheets-Sheet 3
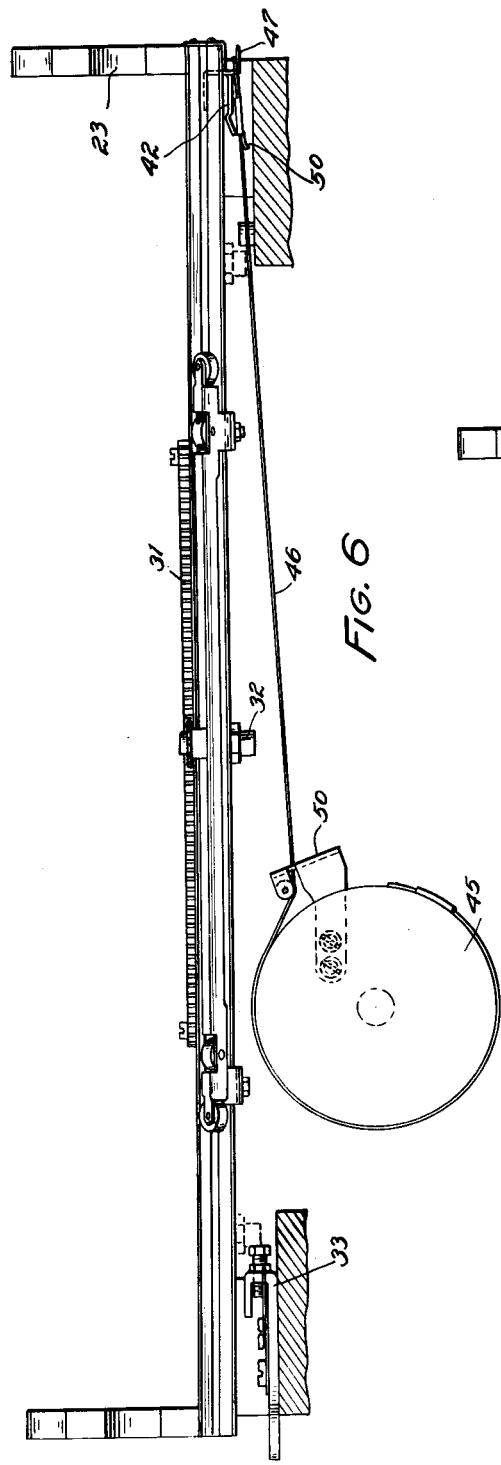
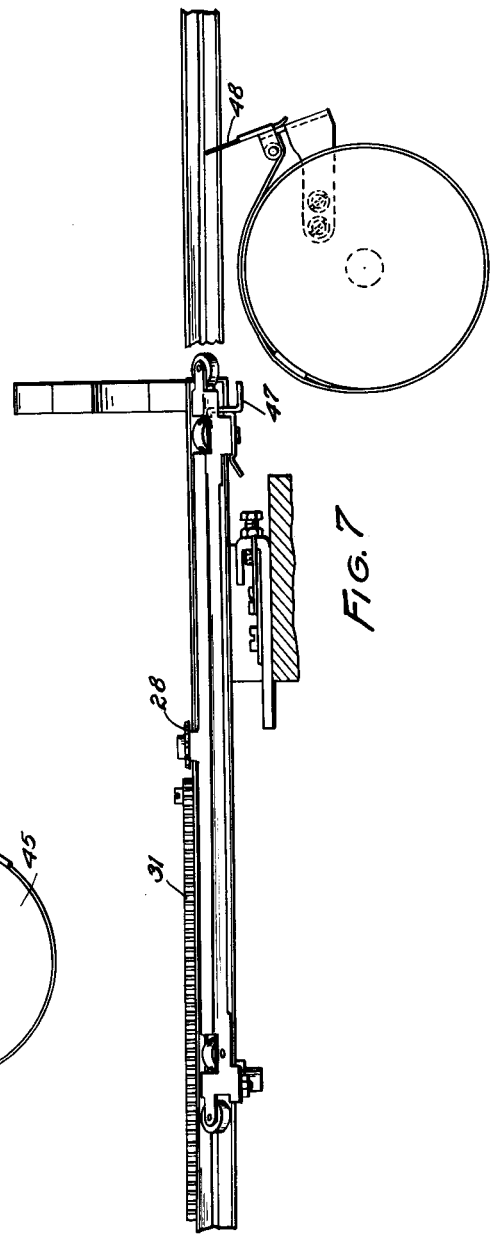
Inventor
Otto A. Hokanson
By Nissen & Crane Attys May 3, 1927.

O. A. HOKANSON 1,627,390

REMOVABLE CARRIAGE FOR TYPEWRITERS

Filed Sept. 12, 1924     6 Sheets-Sheet 4

Inventor
Otto A. Hokanson
By Nissen & Crane Attys

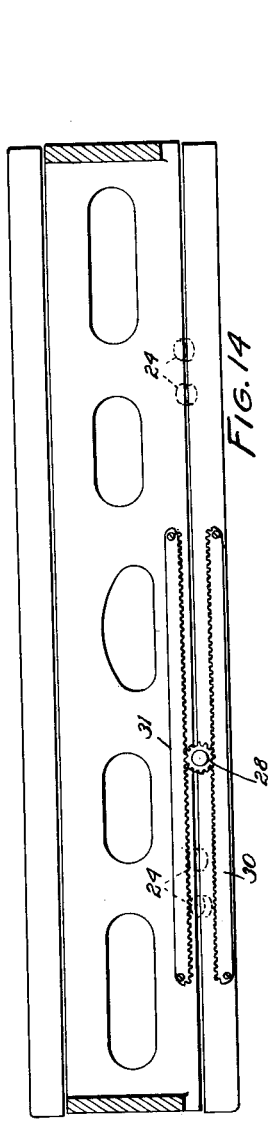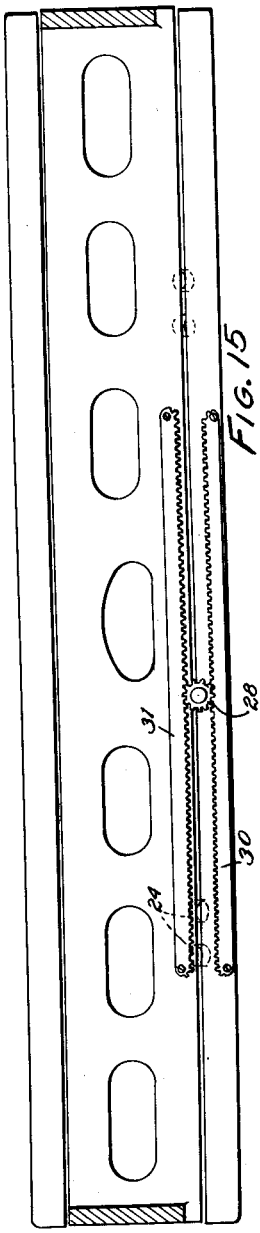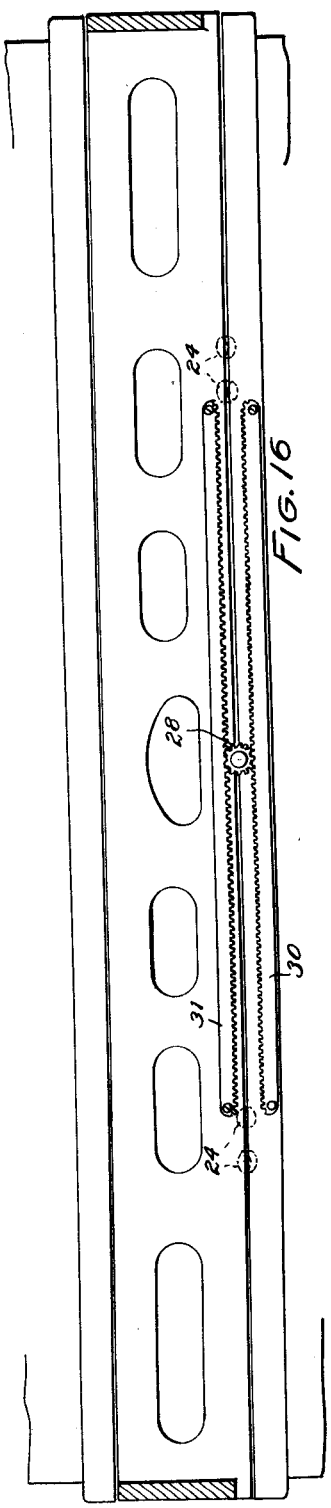

May 3, 1927.
O. A. HOKANSON
1,627,390
REMOVABLE CARRIAGE FOR TYPEWRITERS
Filed Sept. 12, 1924    6 Sheets-Sheet 6
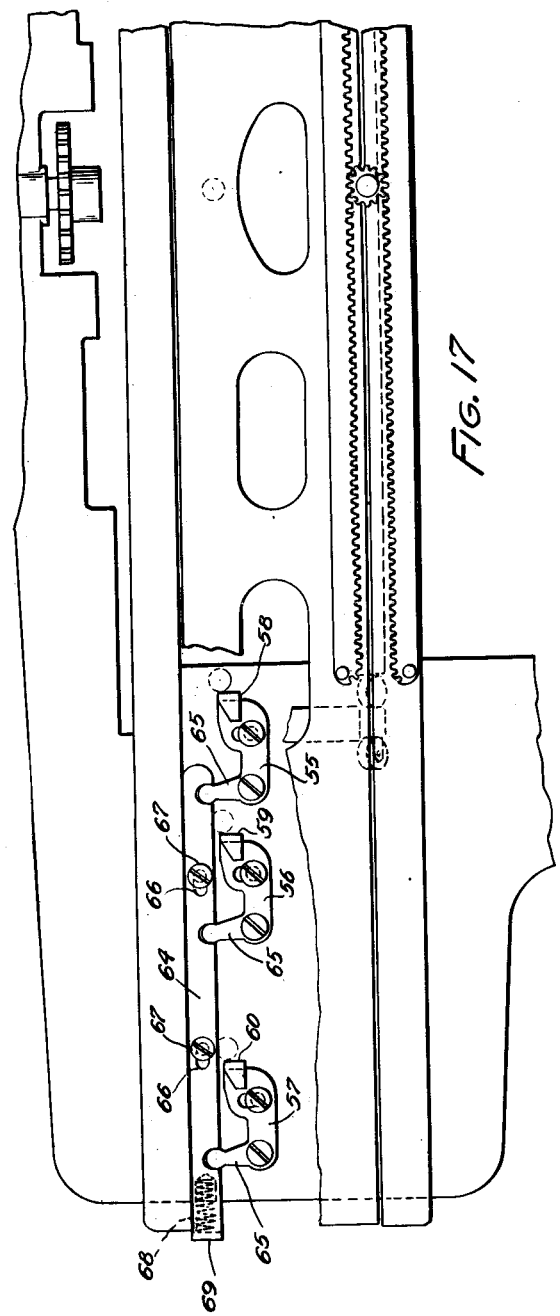
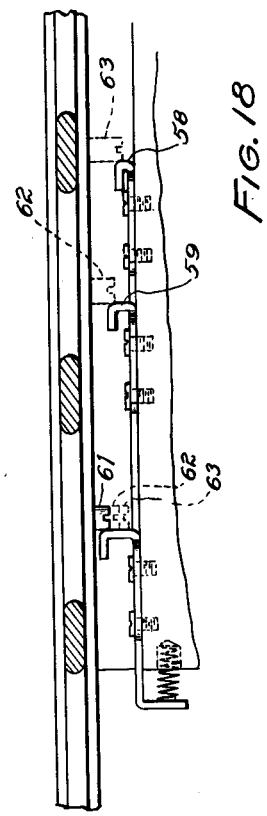
Inventor
Otto A. Hokanson
By Nissen & Crane Attys Patented May 3, 1927.

1,627,390

UNITED STATES PATENT OFFICE.

OTTO A. HOKANSON, OF WOODSTOCK, ILLINOIS, ASSIGNOR TO WOODSTOCK TYPEWRITER COMPANY, OF WOODSTOCK, ILLINOIS, A CORPORATION OF ILLINOIS.

REMOVABLE CARRIAGE FOR TYPEWRITERS.

Application filed September 12, 1924. Serial No. 737,226.

This invention relates to typewriter mechanism in which the carriage may be readily removed and replaced for any desired purpose, such as for the purpose of substituting a carriage of different length.

The invention is exemplified in the combination and arrangement of parts shown in the accompanying drawing and described in the following specification, and it is more particularly pointed out in the appended claims.

In the drawings—

Fig. 1 is an end elevation of a typewriter carriage constructed according to the present invention;

Fig. 2 is a transverse section of the guideways for the carriage showing the roller retainer;

Fig. 3 is a fragmentary section showing the stop mechanism for limiting the movement of the carriage;

Fig. 4 is a top plan view of the carriage support with the platen and associated parts removed;

Fig. 5 is a plan view of the roller retainer;

Fig. 6 is a vertical section showing the roller retainer and actuator drum for the carriage;

Fig. 7 is a view similar to Fig. 6 but showing the carriage in a different position;

Figs. 14, 15 and 16 show the arrangement of racks for the roller retainer for different lengths of carriage;

Fig. 17 is a plan view showing a modified form of carriage stop for different length carriages; and Fig. 18 is a vertical section showing the stops in Fig. 17 in elevation.

Figure 8:
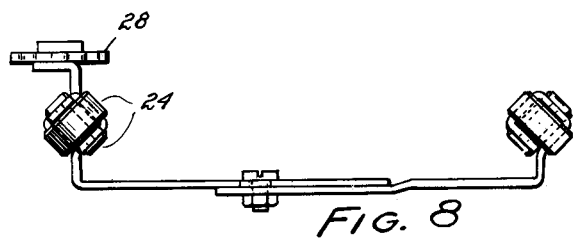
Fig. 8 is an end view of the roller retainer.
Figure 9:
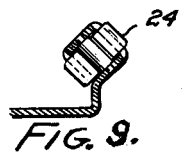
Fig. 9 is a fragmentary section showing the mounting of one of the rollers in the retainer.
Figure 11:
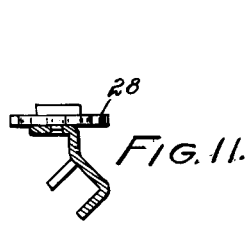
Fig. 11 is a fragmentary section showing the mounting of the pinion on the roller retainer.
Figure 10:
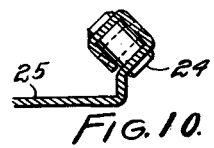
Fig. 10 is a view similar to Fig. 9 showing the mounting of the roller at a different angle from that of Fig. 9.
Figure 13:
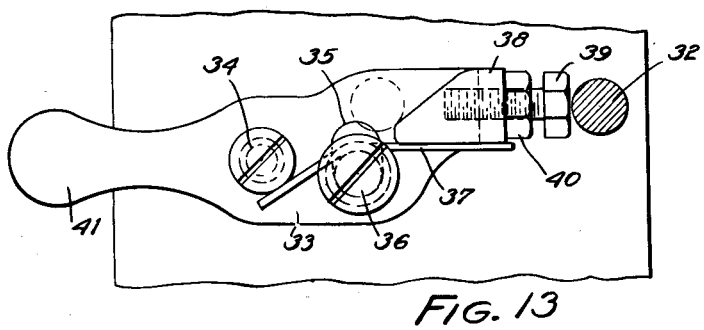
Fig. 13 is a plan view of the removable carriage stops.

As shown in Fig. 1, the numeral 20 designates the top portion of a typewriter frame having guide rails 21 and 22 thereon. The rails 21 and 22 have V-ways on their inner faces arranged in opposition to similar ways on the platen carriage 23. Rollers 24 are disposed between the guideways for the carriage and are held in place by a roller retainer 25. The rollers 24 are arranged in pairs at opposite ends of the retainer 25, the rollers of each pair having their axes disposed at right angles to one another, as shown in Figs. 9 and 10, respectively. In this way the carriage is accurately guided in its supporting ways. The cross-bars 26 of the retainer 25 are made adjustable by means of screw and slot connections 27 so that the rollers may be properly spaced relative to the width of the carriage guideway. In order that the retainer 25 may always travel at the proper rate relative to the movement of the carriage and be held in correct position, a pinion 28 is journaled on a stud 29 mounted on the retainer 25. The pinion 28 meshes with racks 30 and 31 which are secured to the frame and carriage, respectively. It will be seen that this will impart a movement to the roller retainer having a rate equal to half that of the movement of the carriage, which is the correct rate for the journals upon which the rollers 24 are mounted. In order to prevent the carriage from being accidentally moved endways out of its guides 21 and 22, a stop 32 is secured to the carriage and a counter-stop 33 is mounted on the typewriter frame, as shown in Figs. 6 and 13. The counter-stop 33 is pivoted at 34 and provided with a slot 35 which engages a pin 36 on the typewriter frame. A spring 37 surrounds the pin 36 and bears against a shoulder 38 on the stop 33. A contact screw 39 is threaded in the shoulder 38 and provided with a lock nut 40. The stop 33 and slot 35 normally hold the contact screw 39 in the path of the stop 32, but when it is desired to remove the carriage from the typewriter the contact screw 39 may be swung out of the path of the stop 32 by means of the handle 41 which is connected with the stop 33 and projects beyond the typewriter frame at one side thereof. When the counter-stop 33 is moved to permit the stop 32 to pass, the carriage may be drawn from its guide by moving it to the left, as shown in Fig. 7. This will bring the pinion 28 past the end of the rack 30 and will withdraw the rack 31 from the pinion, as shown in Fig. 7. A spring clip 42 is secured to the end of the carriage 23 in position to engage the end bar 43 of the retainer 25 as soon as the retainer is released from the racks 30 and 31. This will clamp the retainer in its endmost position to the carriage so that when the retainer is again slid into place in its guides the rack 39 will engage the pinion 28 so that the movement of the pinion in unison with the carriage will be arrested and the pinion will again be brought into mesh between the two racks. This will withdraw the cross-bar 43 from the spring clip 42 and restore the roller retainer to its proper position relative to the carriage and its supporting guides. It will thus be seen that to remove the carriage it is only necessary to displace the counter-stop 33 and draw the carriage from its guides. The mechanism described will automatically hold the roller retainer in position on the carriage while it is removed and restore the retainer to its proper position when the carriage is again returned.

Figure 12:
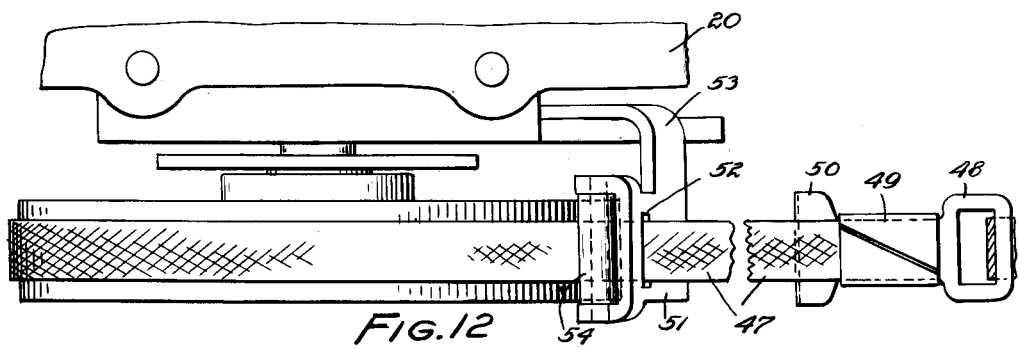
Fig. 12 is a top plan view of the spring drum showing the connection for the tension member.

Means is also provided for automatically disconnecting the tape for the spring drum and for restoring the connection upon return of the carriage. This mechanism is shown in Figs. 6, 7 and 12. The spring drum 45 is journaled on the typewriter frame beneath the carriage and is connected by means of a tape 46 with a clip 47 extending downwardly from the end of the carriage. The end of the tape 46 has a metal loop 48 secured to the end thereof by a sleeve 49 folded about the end of the tape. An inwardly projecting tailpiece 50 is connected with the loop 48 which is curved down slightly and arranged to engage the face of a guide plate 51 through which the tape passes as it is directed onto the drum 45. When the tailpiece 50 strikes the plate 51 the spring drum will draw the tape 46 through the opening 52 in the guide plate so that the loop 48 will be thrown into an upright position, as shown in Fig. 7. This will permit the clip 47 to be readily withdrawn from the loop as the carriage is removed from its support. The loop 48 will be retained in position to reengage the clip 47 when the carriage is restored. The guide plate 51 is mounted on a bracket 53 secured to the carriage frame 20. A roller 54 is journaled in the bracket 53 to prevent friction of the tape 46 against the bracket.

In Figs. 14, 15 and 16 there are shown in plan view the carriage bases and guides for 11, 14 and 18 inch carriages, respectively. It is frequently desirable to use one of the smaller carriages on machines built to take the carriages of greater length. By the arrangement shown in Figs. 14, 15 and 16 a machine of any size will take the carriage of any smaller machine. It will be noted that the left-hand end of the rack 30 is arranged the same distance from the center line of the machine for all sizes. If the carriage in Fig. 14 is slid into the guides of the machine shown in Fig. 16, for instance, the end of the rack 31 will strike the end of the rack 30 at the time when the carriage is the same distance from the center line of the machine as when the carriage is placed on its own frame shown in Fig. 14. Thus the travel of the carriage is the same relative to the center line irrespective of whether the carriage is placed on the frame of one length or another. In the longer lengths of frame guides it is desirable to provide stops for all carriages of lesser lengths than the maximum length carriage that will be taken by the guides as well as for the maximum length carriage itself. The manner of arranging the stops for this purpose is shown in Figs. 17 and 18. In place of a single counter-stop lever 33 there is provided a plurality of stop levers 55, 56 and 57 having stop shoulders 58, 59 and 60, respectively, arranged in longitudinal alinement, but projecting upwardly to different heights, as shown in Fig. 18. The longest carriage to be used on the long guide frame is provided with a single short stop 61 which is of such a length as to pass over both stops 58 and 59 but to engage stop 60, arresting the long carriage at its proper limit of travel. The next length carriage is provided with a stop 62 which is of proper length to pass over counter-stop 58, but to be arrested by counter-stop 59. This gives the proper range of movement for the second length of carriage. The shortest carriage is provided with a stop 63 which is of proper length to be arrested by the counter-stop 58. A single spring bar 64 cooperates with tailpieces 65 on each of the levers 55, 56 and 57 so that by moving the slide bar 64 all of the counter-stops are moved out of the path of the carriage stops so that irrespective of which carriage is being used at any particular time movement of the bar 64 will clear the way to permit removal of the carriage. Slots 66 cooperating with screws 67 retain the bar 64 in place and a spring 68 normally holds the stops 58, 59 and 60 in the path of the carriage stops. The end of the bar 64 extends past the end of the frame and is provided with a finger piece 69 which is depressed to release the stops.

I claim:—

1. The combination with a typewriter frame, of guides mounted on said frame, a platen carriage slidably mounted in said guides, bearing rollers interposed between said carriage and guides, a frame for holding said rollers, racks on said typewriter frame and carriage, respectively, a pinion journaled on said roller-holding frame and meshing with said racks, said carriage being movable endwise from said guides to remove said carriage from said typewriter frame, disconnecting said racks from said pinion, and means for retaining said roller-holding frame in position on said carriage when said carriage is removed from said guides.

2. In combination, a platen carriage, guides for said carriage, a support for said guides, rollers interposed between said carriage and guides, a frame for holding said rollers, racks carried respectively by said carriage and guide support, a pinion interposed between said racks and journaled on said frame, a stop for limiting the movement of said carriage in said guides, said stop being movable to permit said carriage to be slid endways from said guides thus disengaging said racks from said pinion, and means for automatically securing said frame to said carriage to hold said frame in proper position for the pinion thereon to re-engage said racks when said carriage is restored to its guides.

3. The combination with a typewriter frame, of a platen carriage slidably mounted thereon, roller bearings for said platen carriage, a roller retainer frame for said bearings, and a spring clip for securing said retainer frame to said carriage when said carriage is moved beyond its normal range of travel.

4. The combination with a typewriter frame, of guides thereon, a platen carriage slidably mounted in said guides, rollers for said platen carriage, a retainer frame for said rollers, a pinion journaled on said retainer frame, racks on said typewriter frame and platen carriage, respectively, arranged to mesh with said pinion, and a spring clip on said platen carriage for automatically engaging said retainer frame when said carriage is moved beyond its normal range of travel to disengage said racks from said pinion.

5. The combination with a typewriter frame, of guides thereon, a platen carriage slidably mounted in said guides, roller bearings interposed between said carriage and guides, a retainer frame for said bearings, a pinion journaled on said retainer frame, racks on said carriage and typewriter frame, respectively, meshing with said pinion, a stop for limiting the movement of said carriage along said guides, said stop being movable to permit said carriage to be moved beyond its normal range of travel to disengage said carriage from said guides, and a spring clip on said carriage arranged to engage said retainer frame and secure said retainer frame in position on said carriage to properly re-locate said retainer frame when said carriage is restored to said guides.

6. The combination with a typewriter frame, of a carriage slidably mounted thereon, a spring actuated cord for moving said carriage, said cord having a loop therein, a hook on said carriage for engaging said loop, and means for arresting said loop to permit said hook to be withdrawn therefrom when said carriage is moved beyond its normal range of travel, said arresting means arranged to retain said loop in position to re-engage said hook when said carriage is returned.

7. The combination with a typewriter frame, of a platen carriage slidably mounted thereon, a cord for moving said carriage, a spring drum for actuating said cord, said cord having a loop thereon, a hook on said carriage for engaging said loop, a stop adjacent the path of travel of said cord, and a contact member connected with said loop for engaging said stop and for moving said loop into an upright position to permit said hook to be withdrawn therefrom, the tension in said cord acting to retain said loop in said position for re-engagement with said hook when said carriage is returned.

8. The combination with a typewriter frame, of a platen carriage slidably mounted thereon, roller bearings for said platen carriage, a bearing retainer for said bearings, a spring actuated member for moving said carriage on said frame, said carriage being movable beyond its normal range of travel for removal from said frame, means for automatically holding said roller retainer to said carriage to restore said retainer to operative position when said carriage is returned, and means for holding said spring actuated member in position to re-engage said carriage when said carriage is returned.

9. The combination with a typewriter frame, of guides thereon, a platen carriage slidably mounted in said guides, rollers for said guides, a roller retainer, a pinion journaled on said retainer, racks on said typewriter frame and platen carriage for meshing with said pinion, a stop for limiting the movement of said carriage, said stop being movable to permit said carriage to move beyond its normal range for removal from said guides, a spring clip for automatically engaging said roller retainer to re-position said retainer when said carriage is returned to its normal range of travel, a spring actuated cord for moving said carriage, said cord having a loop therein, a hook on said carriage, a stop adjacent the path of said cord, and means connected with said loop for engaging said stop to move said loop into upright position when said carriage is moved beyond its normal range of travel and for retaining said loop in said position to permit reengagement thereof with said hook when said carriage is returned to its normal range.

10. In combination, a typewriter frame having platen carriage guides thereon, a series of carriages of different lengths arranged to be alternatively mounted in said guides, a roller retainer for each carriage, a pinion on each of said retainers, a rack on said typewriter frame for engaging said pinions, and a rack on each of said carriages for engaging the pinion on said carriage, the rack of each carriage having one end thereof disposed at the same distance from the center of said carriage as the corresponding ends of the racks on the other carriages.

11. In combination, a typewriter frame having platen carriage guides thereon, a series of platen carriages of different lengths arranged to slide in said guides, rollers for said platen carriages, a roller retainer for each of said platen carriages, a pinion journaled on each of said roller retainers, a rack on said typewriter frame in position to mesh with said pinions, different length racks on said carriages for engaging the pinions thereon, the rack on each carriage being arranged with one end thereof at the same distance from the center of said carriages as the corresponding ends of the racks on the other carriages, and means for retaining said roller retainers in fixed position on their respective carriages.

12. In a typewriter, a supporting frame, guides on said frame, a plurality of different length carriages each arranged to slide in said guides, a plurality of stops on said typewriter frame, and a stop on each of said carriages, each stop on said frame being positioned to engage a stop on one sized carriage only.

13. In combination, a typewriter frame, guides on said frame, a plurality of carriages of different lengths arranged to slide in said guides, each carriage having a stop thereon, the stops on the different carriages being of different lengths, a plurality of stops on said typewriter frame, said stops being of a length to engage different length stops on said carriages, and means for shifting all of the stops on said typewriter frame out of operative position.

14. The combination with a typewriter frame, of guides on said frame, a plurality of platen carriages of different lengths arranged to move in said guides, stops on said carriages, the stops on the carriages of different lengths being graded in size, counter-stops on said typewriter frame arranged in the path of movement of the stops on said carriages but spaced in different positions along said path, each stop on said frame being arranged to arrest the carriages of one length but to permit the stops on carriages of greater lengths to pass without arresting the same, and means to displace all of said counter-stops to permit free passage of any carriage stop.

In testimony whereof I have signed my name to this specification on this 9th day of September A. D. 1924.

OTTO A. HOKANSON.